United States Patent
Mojabi et al.

(10) Patent No.: US 11,468,133 B1
(45) Date of Patent: Oct. 11, 2022

(54) RECOMMENDING ONLINE COMMUNICATION GROUPS BY MATCHING UNSTRUCTURED TEXT INPUT TO CONVERSATIONS

(71) Applicant: SUPPORTIV INC., Berkeley, CA (US)

(72) Inventors: Pouria Mojabi, Oakland, CA (US); Helena Plater-Zyberk, Oakland, CA (US)

(73) Assignee: Supportiv Inc., Berkeley, CA (US)

( * ) Notice: Subject to any disclaimer, the term of this patent is extended or adjusted under 35 U.S.C. 154(b) by 0 days.

(21) Appl. No.: 17/551,668

(22) Filed: Dec. 15, 2021

(51) Int. Cl.
| | | |
|---|---|---|
| *G06F 16/9535* | (2019.01) | |
| *G06F 16/35* | (2019.01) | |
| *H04L 51/10* | (2022.01) | |
| *G06N 20/00* | (2019.01) | |
| *G06F 16/33* | (2019.01) | |

(52) U.S. Cl.
CPC ...... *G06F 16/9535* (2019.01); *G06F 16/3346* (2019.01); *G06F 16/353* (2019.01); *G06N 20/00* (2019.01); *H04L 51/10* (2013.01)

(58) Field of Classification Search
CPC .............................. G06F 16/3346; H04L 51/04
See application file for complete search history.

(56) References Cited

U.S. PATENT DOCUMENTS

| | | | |
|---|---|---|---|
| 8,484,225 B1 * | 7/2013 | Datta ....................... | G06N 5/02 707/752 |
| 10,650,311 B2 | 5/2020 | Henry | |
| 10,657,676 B1 | 5/2020 | Rehfeld et al. | |
| 11,017,167 B1 | 5/2021 | Podgorny et al. | |
| 11,250,039 B1 | 2/2022 | Chang et al. | |
| 2010/0057857 A1 * | 3/2010 | Szeto ....................... | H04L 51/04 709/206 |
| 2010/0205541 A1 * | 8/2010 | Rapaport ................. | G06Q 30/02 715/753 |
| 2012/0236103 A1 * | 9/2012 | Cahill ...................... | G06Q 10/101 348/14.01 |
| 2015/0156154 A1 | 6/2015 | Russell et al. | |
| 2017/0180497 A1 | 6/2017 | Comstock et al. | |
| 2018/0157758 A1 | 6/2018 | Arrizabalaga et al. | |
| 2018/0174037 A1 | 6/2018 | Henry | |
| 2019/0349441 A1 | 11/2019 | Comstock et al. | |
| 2019/0362253 A1 * | 11/2019 | Francis ................... | G06N 5/046 |
| 2020/0117649 A1 | 4/2020 | Arnold et al. | |
| 2020/0327190 A1 | 10/2020 | Agrawal et al. | |

(Continued)

*Primary Examiner* — Grace Park
(74) *Attorney, Agent, or Firm* — Baker Botts L.L.P.

(57) ABSTRACT

A computer joining an online chat service, based on unstructured text input, can be matched automatically under computer control to one of multiple different online chat conversations using a trained transformer-based machine learning model, training techniques, and similarity assessment techniques. Computer analysis in this manner improves the likelihood that the unstructured text input results in assigning the computer to a relevant chat conversation. Additionally, or alternatively, a dense passage retrieval machine learning model having a first encoder for resources and a second encoder for messages can automatically match relevant resources to computers or sessions based on analysis of a series of messages of an online chat conversation. In either approach, continuous re-training is supported based on feedback from a moderator computer and/or user computers.

12 Claims, 6 Drawing Sheets

(56) References Cited

U.S. PATENT DOCUMENTS

| | | |
|---|---|---|
| 2021/0294781 A1 | 9/2021 | Musoles et al. |
| 2021/0328888 A1* | 10/2021 | Rath .................. H04L 41/5074 |
| 2021/0334300 A1 | 10/2021 | Banda |

* cited by examiner

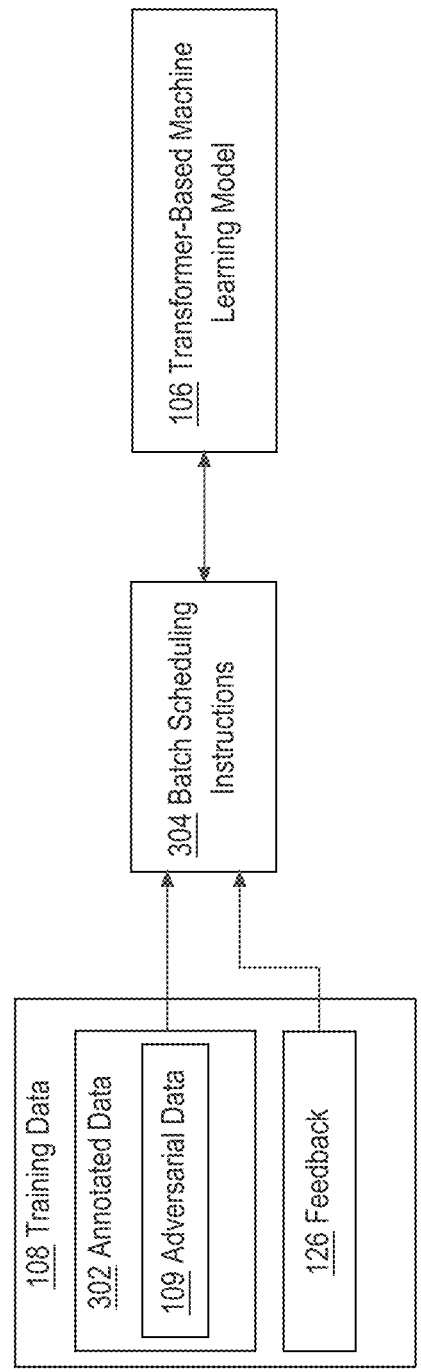

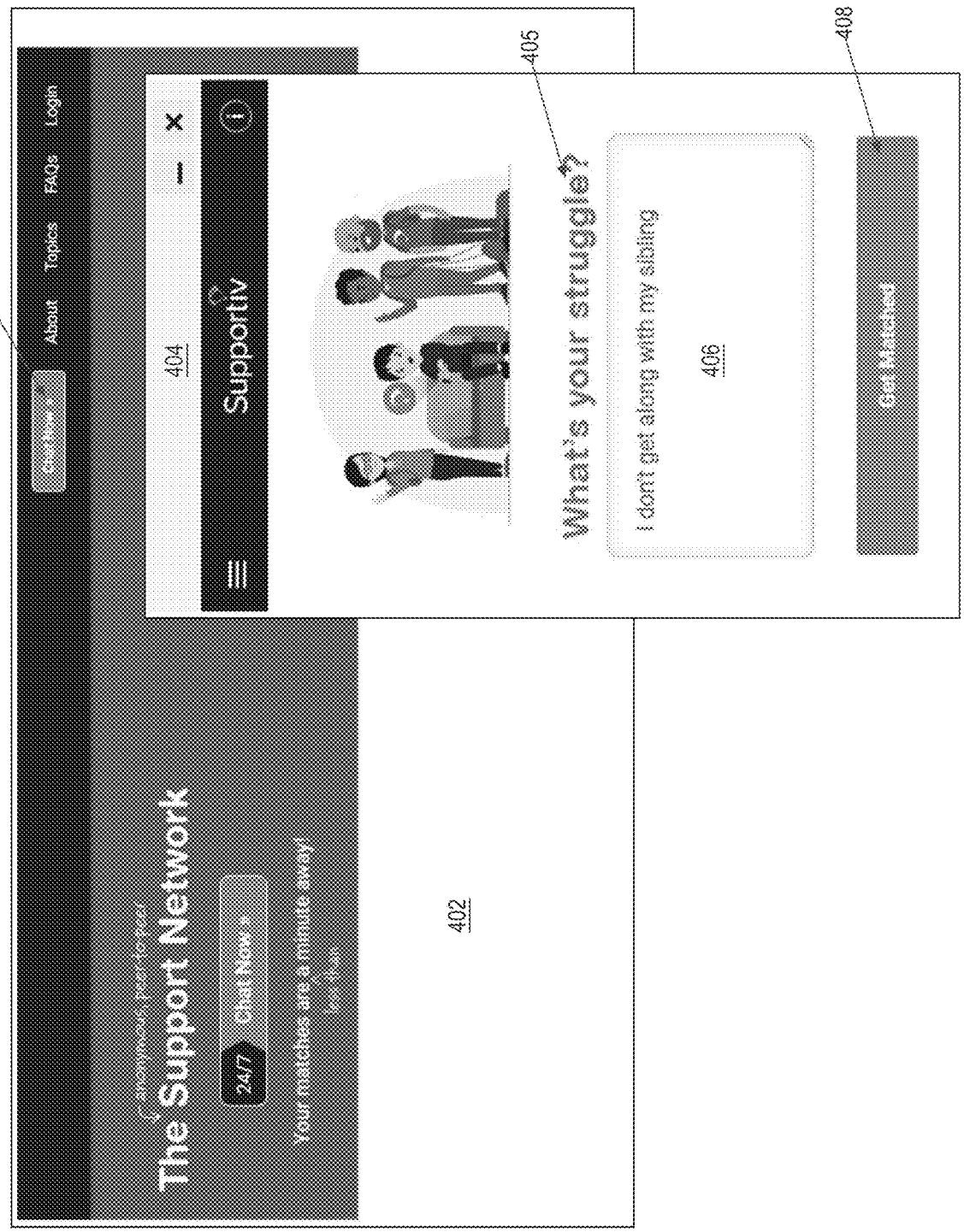

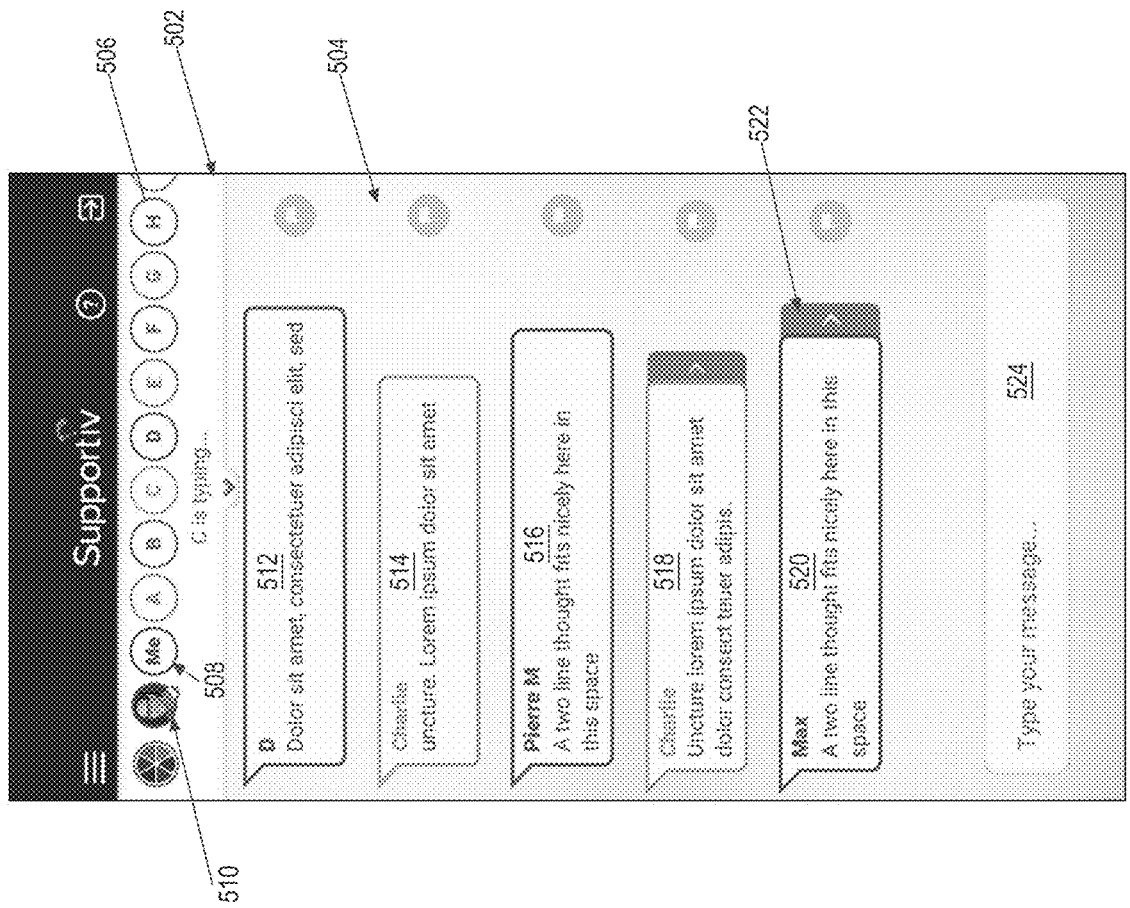

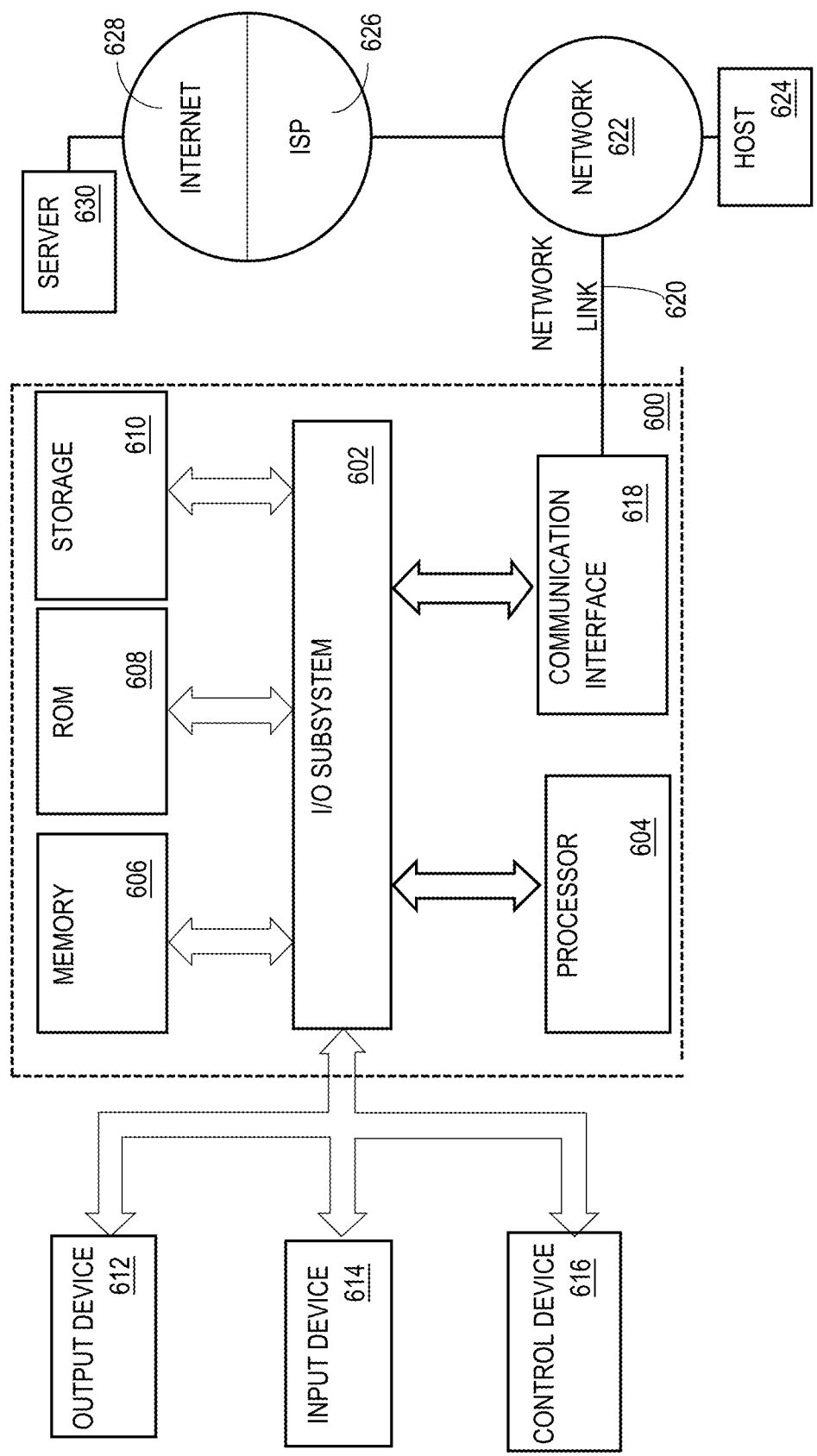

RECOMMENDING ONLINE COMMUNICATION GROUPS BY MATCHING UNSTRUCTURED TEXT INPUT TO CONVERSATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Supportiv Inc.

TECHNICAL FIELD

One technical field of the present disclosure is computer-implemented machine learning as applied to similarity matching for pairs of items, including dense passage retrieval (DPR) models and TRANSFORMER-based models. Another technical field is processing natural language input from online conversations, such as electronic chat conversations, using machine learning models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data scientists have developed a variety of computer-implemented techniques for inspecting natural language text, such as a query, with records in a digital database. The conventional approach to this task is unsupervised text retrieval. A query and existing data are encoded using an encoder such as word2vec, doc2vec, LDA or tf-idf. The computer is programmed to consecutively quantify the similarity between the encoded vectors using a similarity metric such as cosine. This approach is suboptimal because it is unsupervised, and thus does not allow for training the model on the specific task and data. Furthermore, the unsupervised nature of these approaches does not permit continuous improvement by updating its training set to address past errors.

Online conversation systems, such as electronic chat rooms, have become widely used. General-purpose examples include SLACK, REDDIT, WHATSAPP, MESSENGER, FACEBOOK GROUPS, ACQUIRE.IO, and ZENDESK. Use of chat rooms can involve a succession of related, short messages. However, the conventional machine learning approaches for processing queries contained in chat messages suffer from the drawback of explicit reliance on a single input query for the purpose of classification or matching. This approach is suboptimal because the typical electronic chat conversation involves multiple messages that often are related by a common context or topic. Correct classification of users or accounts to groups can be important and even drive sales or advertising revenue in applications or domains such as merchant websites, content sharing platforms and search engines.

SUMMARY

The appended claims may serve as a summary of the invention.

BRIEF DESCRIPTION OF THE DRAWINGS

In the drawings:

FIG. 3 illustrates an example process of training a machine learning model.

FIG. 4 illustrates an example computer display device with graphical user interface that can be programmed to accept content input.

FIG. 5 illustrates an example of a digital display device with portions of graphical user interfaces that can be used in certain embodiments.

FIG. 6 illustrates a computer system with which one embodiment could be implemented.

DETAILED DESCRIPTION

Figure 1:
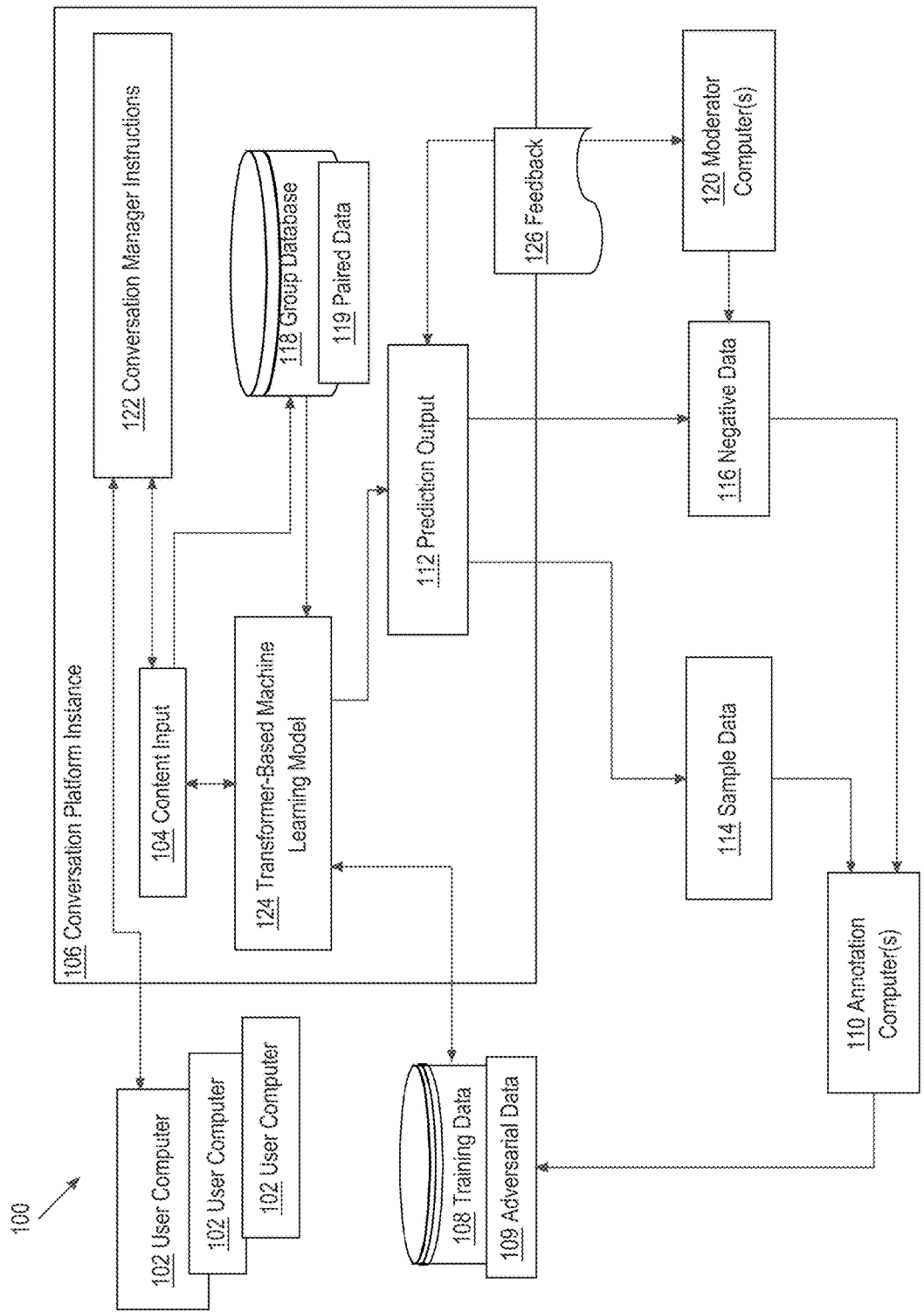
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview

1. General Overview

A computer joining an online chat service, based on unstructured text input, can be matched automatically under computer control to one of multiple different online chat conversations using a trained transformer-based machine learning model, training techniques, and similarity assessment techniques. Computer analysis in this manner improves the likelihood that the unstructured text input results in assigning the computer to a relevant chat conversation. In the disclosed approach, continuous re-training is supported based on feedback from a moderator computer and/or user computers.

Certain embodiments of a conversation platform instance are described herein as being programmed to facilitate discussions of mental health concerns of users of user computers or user accounts. However, the techniques disclosed herein are not limited to that domain. Instead, the techniques disclosed herein apply to any domain of healthcare or of conversational commerce. For example, an embodiment could be configured to match conversations about opinions, politics, products or articles among people concurrently interested in discussing an interest, topic, or hobby. As a specific example, an embodiment could be configured to match conversations about a political debate or a live sports or entertainment event, a digital meet up of crafting enthusiasts, or grouping of home stereo equipment or audiophile product fans in which user computers communicate chat conversations about what they want to buy as a text input. Another embodiment could be to allow experts (e.g., contractors, lawyers, accountants, teachers, etc.) to consult with a group of people with a similar need simultaneously providing time and cost savings to these experts. Any commercial domain that can benefit from matching of user computers to conversations can use the techniques disclosed herein.

In an embodiment, a conversation platform instance can be programmed to interpret emotional needs expressed via user computers and to support those needs by matching their emotional struggles with the most optimal group of peers experiencing a related struggle, which is described in connection with FIG. 1, FIG. 2, and FIG. 3.

In one embodiment, a computer-implemented method comprises using a first computer, operating a plurality of different online chat conversations, each of the online chat conversations being associated with a set of sessions that are associated with different second computers, each of the online chat conversations being associated with two or more content items; receiving, from a third computer, a content input comprising an unstructured text; creating and storing, in memory of the first computer, a plurality of paired data, each of the paired data associating the content input with one of the two or more content items; processing the paired data using a trained transformer-based machine learning model to generate prediction output comprising an identification of a particular content item among the content items having a probability value representing a greatest similarity of the particular content item to the content input; assigning the third computer to a particular online chat conversation among the plurality of different online chat conversations, the particular online chat conversation being associated with the particular content item. In one feature, the one or more content items respectively identifying one or more first personal struggles and the content input identifying a second personal struggle.

In another feature, the method further comprises determining whether the probability value is greater than a maximum similarity threshold value in comparison to at least one of the content items; determining whether a difference of the probability value and a least similar content item is greater than at least a minimum threshold similarity value; assigning the third computer to a particular online chat conversation only when the probability value is greater than the maximum similarity threshold value and the difference of the probability value and the least similar content item is greater than at least the minimum threshold similarity value.

In another feature, the method further comprises presenting, to a fourth computer, data identifying the third computer and the particular online chat conversation; receiving, in response to the presenting, negative data from the fourth computer; adding the negative data to a set of training data; re-training the transformer-based machine learning model using the set of training data.

In another feature, the method further comprises, prior to adding the negative data to the set of training data and re-training the transformer-based machine learning model using the set of training data, transmitting the negative data to one or more annotation computers; receiving, from the one or more annotation computers, one or more annotation data to label the negative data. In another feature, the method further comprises creating and storing training data comprising annotated data and feedback, each of the annotated data and the feedback having been formed by transmitting at least a portion of the prediction output to one or more annotation computers and receiving, from the one or more annotation computers, one or more annotation data to label the annotated data and feedback, the annotated data comprising at least a portion of adversarial data comprising one or more manually labeled adversarial prediction examples; training the transformer-based machine learning model using the set of training data, including providing, in alternative batches, at least a portion of the annotated data and at least a portion of the feedback.

In some embodiments, the transformer-based machine learning model comprising a supervised RoBERTa language model.

In an embodiment, the disclosure provides one or more non-transitory computer-readable storage media storing one or more sequences of instructions which, when executed using one or more processors, cause the one or more processors to execute: using a first computer, operating a plurality of different online chat conversations, each of the online chat conversations being associated with a set of sessions that are associated with different second computers, each of the online chat conversations being associated with two or more content items; receiving, from a third computer, a content input comprising an unstructured text; creating and storing, in memory of the first computer, a plurality of paired data, each of the paired data associating the content input with one of the two or more content items; processing the paired data using a trained transformer-based machine learning model to generate prediction output comprising an identification of a particular content item among the content items having a probability value representing a greatest similarity of the particular content item to the content input; assigning the third computer to a particular online chat conversation among the plurality of different online chat conversations, the particular online chat conversation being associated with the particular content item.

In other embodiments, the one or more non-transitory computer-readable storage media can comprises one or more sequences of instructions which, when executed using the one or more processors, cause the one or more processors to use, provide, or execute any of the functions or features that have been previously described.

2. Structural & Functional Overview

2.1 Example Processing System

FIG. 1 illustrates a distributed computer system showing the context of use and principal functional elements with which one embodiment could be implemented. FIG. 2 is a flow diagram of an example computer-implemented process or algorithm useful in matching a user computer to one of a plurality of online chat conversations. Referring first to FIG. 1, in an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Figure 2:
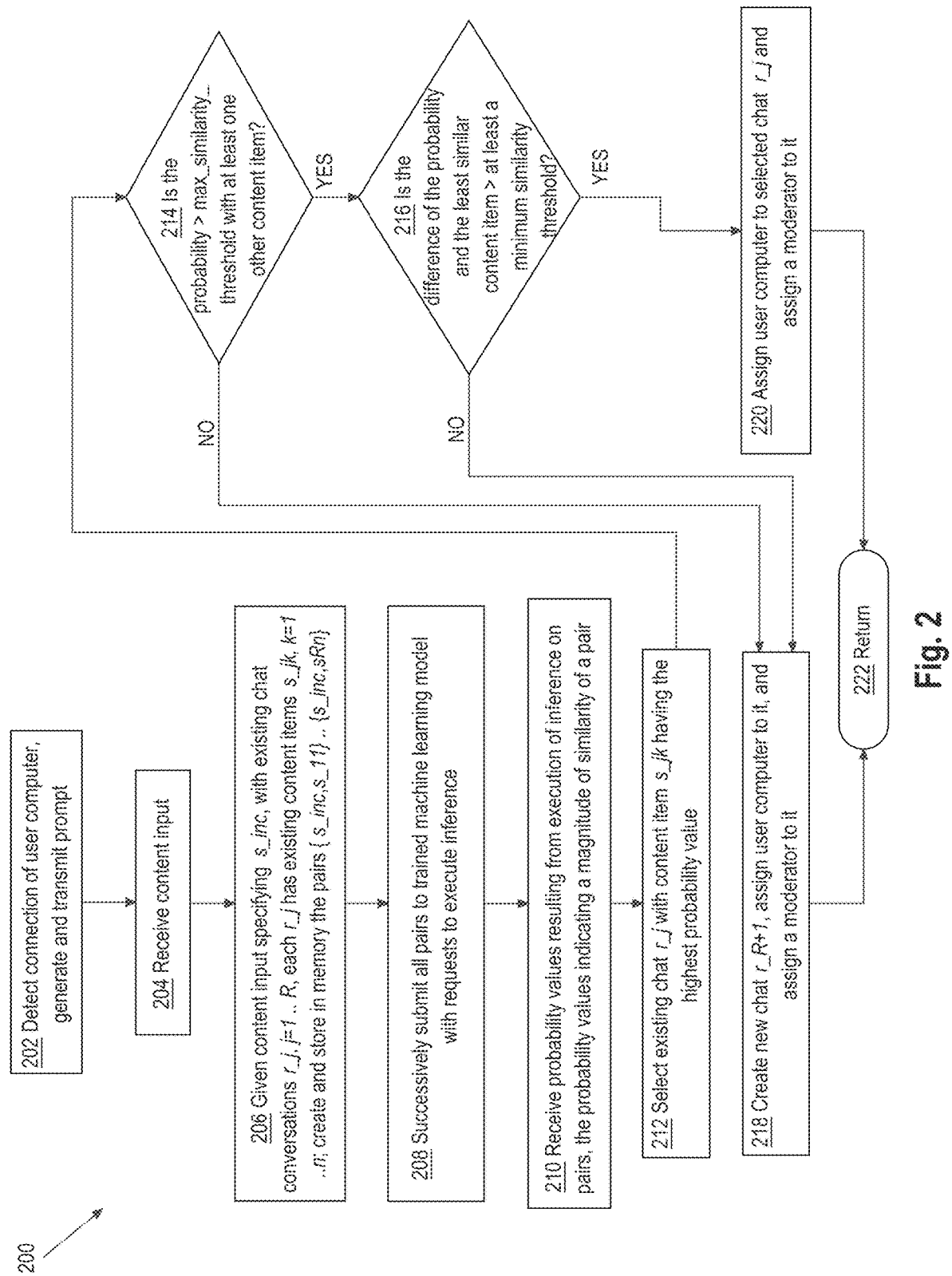
FIG. 2 is a flow diagram of an example computer-implemented process or algorithm useful in matching a user computer to one of a plurality of online chat conversations.

FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Computer system 100 can comprise a plurality of user computers 102 coupled directly or directly via one or more networks to a conversation platform instance 106, which also is coupled to a training database 108, one or more moderator computers 120 and one or more annotation computers 110. Each of the user computers 102, moderator computers 120, and annotation computers 105 comprises any of a desktop computer, laptop computer, tablet computer, smartphone, or other computing device and may be coupled directly or indirectly via one or more network links. Each of the user computers 102, moderator computers 120, and annotation computers 105 can be implemented as shown for computer system 600 (FIG. 6).

User computers 102 can be associated with end users who interact with services that conversation platform instance 106 provides, including but not limited to interactive chat conversations in a particular domain. Moderator computers 120 can be associated with other end users who are responsible to moderate and guide the content of chat conversations, view recommended resources, direct or open resources for access to the user computers 102 during a chat conversation, provide feedback concerning the matching of user computers to chat conversations, provide feedback concerning the relevance of recommended resources to a chat conversation, and other functions as described herein in other sections. Annotation computers 105 can be associated with other end users who enter or provide labels, annotations, or other feedback concerning training data, matching recommendations of users to conversations or resources, or other annotations of data that the conversation platform instance 106, as described herein in other sections.

In one commercial implementation, the conversation platform instance 106 is programmed to facilitate discussions of mental health concerns of users of user computers 102. As noted in other sections, the techniques disclosed herein are not limited to that domain and apply to any domain of conversational commerce. Any commercial domain that can benefit from matching of user computers to conversations, and matching of conversations to resources, can use the techniques disclosed herein.

In an embodiment, user computers 102, moderator computers 120, annotation computers 110, and training data can be coupled to the conversation platform instance 106 via one or more local area networks, wide area networks, or internetworks, using any of wired or wireless, terrestrial or satellite data links.

In an embodiment, the conversation platform instance 106 comprises sequences of executable stored program instructions that are organized in the functional units, packages, and elements shown in FIG. 1 and executed or hosted using one or more virtual computing instances in a private datacenter, public datacenter, and/or cloud computing facilities. In an embodiment, the conversation platform instance 106 can be implemented as described for computer system 600 (FIG. 6). In an embodiment, the conversation platform instance 106 can include conversation manager instructions 122, a transformer-based machine learning model 124, and a group database 118.

The conversation manager instructions 122 can be programmed to accept connections from user computers 102, receive initial input and message input from user computers, prepare content input 104 for use in other elements, and manage presentation of graphical user interface elements to the user computers, as further described in other sections herein. The transformer-based machine learning model 124 can be programmed as a supervised RoBERTa language model, the details of which are described herein in other sections. In an embodiment, the training data 108 can be integrated into the conversation platform instance 106 rather than coupled via the network. Training data 108 can include adversarial data 109, as described further in other sections, as one component of training the transformer-based machine learning model 124.

The group database 118 can be programmed to store data concerning conversation groups that include one or more user computers 102 or user accounts and a moderator computer 120, topics or content items associated with the groups, metadata, and control data, as further described.

As the transformer-based machine learning model 124 executes, paired data 119 can be created and stored in tables in group database 118, or in main memory of the conversation platform instance. Execution of the transformer-based machine learning model 124, in an inference stage based upon content input 104, can result in outputting prediction output 112. As described further in other sections, the prediction output 112 can include recommendations of groups that are conducting online conversations or chats, to which user computers 102 or user accounts should be added. The moderator computers 120 can also receive the prediction output 112 and provide feedback 126, which can be incorporated into training data 108 or which can filter or modify the prediction output before it is used.

Execution of the transformer-based machine learning model 124, in the inference stage based upon content input 104, also can produce negative data 116, representing groups or chats that are not recommended, or have lower relevance or confidence scores. The conversation platform instance 106 can be programmed to select sample data 114 from among the prediction output 112, and programmatically transfer the sample data and the negative data 116 to annotation computers 110 for labeling and contribution to the training data 108. For example, the conversation platform instance 106 can be programmed to implement data request functions, via a web-based application that the annotation computers 110 access using a browser; interaction of the annotation computers with the web-based application can cause downloading the sample data 114 and negative data 116 for labeling at the annotation computers, followed by uploading to training data 108. In this manner, the conversation platform instance 106 can implement supervised training with a feedback loop to continuously improve the quality of the transformer-based machine learning model 124.

2.2 Example Process of Matching User Computers or Accounts to Chat Conversations Referring now to FIG. 2, in an embodiment, a programmed process 200 begins at block 202 at which the process detects a connection of a user computer, generates and transmits a prompt.

At block 204, content input is received. In the context of FIG. 1, user computers 102 establish networked connections via browsers to conversation manager instructions 122, which can be implemented as a web-based server application. In an embodiment, creating an account or providing other identifying information is not required. Instead, conversation manager instructions 122 returns a dynamically generated web page that includes, in part, a prompt to input a short set of text or sentence(s) that describe(s) a struggle, challenge, or other issue. Conversation manager instructions 122 can be programmed to pre-process the text input, forming content input 104, and programmatically transmit the content input to the transformer-based machine learning model 124.

FIG. 4 illustrates an example computer display device with graphical user interface that can be programmed to accept content input. FIG. 4 thus forms one example of an implementation of block 204. In an embodiment, a browser of a user computer can access a server computer that hosts a website or web-based application; other embodiments may use mobile device applications or apps that connect to application servers. In the example of FIG. 4, a main page 402 provides introductory information and includes one or more starting point buttons 403, which can be implemented as hyperlinked images. In an embodiment, in response to receiving input via the browser or user computer to one of the starting point buttons 403, the server computer is programmed to generate and return a text input panel 404. The text input panel 404 can be implemented as a window, page, or popup display. In an embodiment, text input panel 404 comprises a text input field 406 that is programmed to receive one or more characters of text input. The text input panel 404 also includes an activation button 408, which is programmed to become available for selection when one or more characters have been entered in text input field 406. In response to entry of the text and a selection of the activation button 408, the text input panel 404 is programmed to submit the text to the server for evaluation as now described.

Executing an inference stage, the transformer-based machine learning model 124 processes the content input 104 against all the active peer group chats on the platform to find a match. Upon finding a match, the user computer 102 is routed to the right peer group chat by returning another dynamically updated web page that contains a chat window with live chat functionality. In an embodiment, for each incoming connection of a user computer 102 that specifies a struggle or other content input, the transformer-based machine learning model 124 is programmed to sort all the existing user struggles or other content items, in all chats, from the most relevant to least relevant. In a training stage, a supervised approach is used to train the transformer-based machine learning model 124 on task-specific data with continual feedback. Given the diversity of struggles that user computers 102 can input, transformer-based machine learning model 124 also is programmed to measure the quality of matching and, under programmed conditions, to open a new chat conversation instead of routing the user to an active in-progress chat.

Matching content input 104 to at chat conversation can be programmed as follows. At block 206, given the content input 104 represented as s_inc, with R existing chat conversations r_j, j=1 . . . R, in group database 118 each r_j can be represented as a record in a relational table having columns that specify existing struggles s_jk, k=1 . . . n. Block 206 is programmed to create and store, in main memory or group database 118, the pairs:

| | |
|---|---|
| s_inc | s_11 |
| s_inc | s_12 |
| . . . | . . . |
| s_inc | sRn |

Paired data 119 in group database 118 can comprise digitally stored records of pairs. During training, each of the pairs is labeled with "0" or "1" to specify whether the pair is a relevant or irrelevant match. During the inference stage of FIG. 2, at block 208, all pairs are successively submitted to the trained machine learning model, which returns a probability value at block 210. A higher probability value denotes a better match between the two struggles. Therefore, for purposes of this disclosure, the terms "probability value" and "similarity value" can be used interchangeably.

At block 212, the process is programmed to select an existing chat r_j with content item s_jk having the highest probability value.

Control then transfers to block 214, at which the process is programmed to test whether the probability value of the selected item s_jk is greater than a maximum similarity threshold value. If so, then control transfers to block 216, at which the process is programmed to test whether the difference of the probability and the least similar content item is greater than at least a minimum similarity threshold. If so, then the tests of block 214, block 216 have confirmed that the selected existing chat r_j is sufficiently similar to s_inc. Therefore, at block 220, the user computer that provided the content input at block 204 is assigned to the existing chat r_j having a specified moderator; if the user computer is the first computer or account to be assigned to the existing chat r_j then a moderator computer is selected and assigned. Selection of a moderator computer can use random selection from a pool of available moderator computers based on a schedule of availability, round-robin assignment, or other techniques.

If the test of block 214 fails, or if the test of block 216 fails, then s_inc is not sufficiently similar to any existing chat. In that case, control transfers to block 218, in which the process is programmed to create a new chat conversation, which may be denoted r_R+1, to assign the user computer to the new chat conversation, and to assign a moderator to the new chat conversation.

As described, the conversation platform instance 106 can be programmed to determine when to open a new chat, or when at least one of the existing chats is sufficiently similar for assigning the user. Each chat contains multiple struggles and therefore conversation platform instance 106 can be programmed to ensure that the incoming user's struggle is sufficiently relevant to all users in the chat, to prevent irrelevant users being grouped together and causing topic drifting. The logic described in preceding sections can implement maximum and minimum threshold values. In an embodiment, process 200 can implement constraints to ensure that an incoming user's struggle assigned to a chat (1) has a similarity above the max_similarity_threshold with at least one other existing struggle, and (2) the similarity with the least similar struggle in the chat be at least minimum_similiarity_threshold. Further, to ensure effective peer support, the maximum number of users in each group is programmed to be less than a specified user_threshold. As a specific example, assume that max_similarity_threshold=0.9, minimum_similiarity_threshold=0.6. The conversation platform instance 106 can be programmed to find:

| Chat Identifier | Existing Struggle Identifiers in Chats 1, 2 | Similarity Score With s_inc | Outcome |
| --- | --- | --- | --- |
| 1 | s_11 | 0.95 | Do not add in chat 1, assign to new chat |
| 1 | s_12 | 0.5 | |
| 1 | s_13 | 0.7 | |
| 2 | s_21 | 0.9 | Add user in chat 2 |
| 2 | s_22 | 0.65 | |

After block 218 or block 220, the process may return control to a calling process at 222. For example, FIG. 2 could be called from a supervisory or control process. The process of FIG. 2 also can be programmed to support chat conversations that are conducted after block 218 or block 220.

It will be apparent from the foregoing description that content input received at block 204, such as text describing user struggles, may have loose syntactic or grammatical organization, containing spelling errors or ambiguous content. To address these challenges, training data 108 can include adversarial data 109, comprising a manually assembled set of adversarial or difficult to learn examples. Adversarial data 109 can be derived from executing iterations of the process of FIG. 2 and manually inspecting errors of the predictive models based upon actual or simulated data.

Predictive performance also can be improved by training models using batch scheduling for alternating batches of training data having different attributes. FIG. 3 illustrates an example process of training a machine learning model. In an embodiment, training data 108 (FIG. 1) can comprise annotated data 302, one component of which is the adversarial data 109, as well as feedback 126. In an embodiment, the annotated data 302 can be a small set of high-quality data that has been annotated by multiple annotators and which is considered correct or gold, and a larger set of user and moderator feedback that is subject to bias of users or moderators and is considered inherently noisy. In one experimental implementation, about 15,000 examples of high-quality or gold data were combined with the user feedback and moderator feedback. Batch scheduling instructions 304 can be programmed to alternately read a batch of the annotated data 302 and a batch of the feedback 126, and to use each alternate batch in successive sessions of training the transformer-based machine learning model 124. Therefore, the batch scheduling instructions 304 are programmed to train the model with alternated batches from gold and noisy data; consequently, the model processes gold examples more often, as they are fewer in number, while also using noisy examples. This approach has been found to increase the generalization capability of the transformer-based machine learning model 124 and to prevent overfitting to the small gold dataset.

The architecture of FIG. 1 also can implement a feedback loop to ensure that transformer-based machine learning model 124 constantly improves over time. In an embodiment, the transformer-based machine learning model 124 generates prediction output 112, which can include at least some negative data 116, and can be sampled to provide sample data 114; annotation computers 110 receive the sample data 114 and negative data 116 and can apply labels to create adversarial data 109, which contributes to training of the transformer-based machine learning model 124. The moderator computers 120 contribute other feedback 126 on prediction output 112, which can join the negative data 116. In this manner, transformer-based machine learning model 124 can receive continuous feedback based on prediction output 112 to update training data 108 for re-training the model.

In some embodiments, conversation platform instance 106 is programmed with logging instructions in which all matching decisions of the model are logged. Logged data records can specify each pair of struggles that the model identified, in association with output predictions including each relevant pair or irrelevant pair. Additionally, the logging instructions can be programmed to log user and moderator ratings regarding the matching. Feedback loop instructions can be programmed to filter out selected model decisions such as identical thoughts and collect pairs of struggles which received a poor rating from users or moderators as S_mistakes. Separately, the feedback loop instructions can be programmed to sample randomly pairs of thoughts, S_random, and add these to the previous set. The resulting set of examples S_mistakes+S_random can be provided to moderator computers 120 for annotation. In one embodiment, feedback loop instructions add to training data 108 only examples that have been annotated by at least three moderator computers, with a total agreement among the three.

When the inference stage is complete and the content input has been matched to a new or similar existing chat conversation, the system may be programmed to generate and display a chat conversation display to facilitate further interaction of the user computer with other user computers and the moderator computer. Referring now to FIG. 5, in an embodiment, a computer display device 502 such as a display screen of a mobile computing device, such as user computer 102, can receive encoded display instructions and render a graphical user interface 504 in the display. In an embodiment, GUI 504 comprises a plurality of account icons 506 that represent user accounts and/or user computers 120 that are then-currently associated in a chat conversation. A "Me" account icon 508 represents a user of the user computer 120, and a moderator icon 510 represents a moderator of the chat conversation. In some embodiments, only the moderator icon 510 includes a reduced-size or thumbnail graphic image of a user and the other icons 506, 508 are anonymized; for example, account icons corresponding to chat participants can display a sequentially assigned letter, number, or alphanumeric combination, rather than a true image, real name, initials, or other personally identifiable information.

In an embodiment, GUI 504 comprises a plurality of chat bubbles 512, 514, 516, 518, 520, each of which comprises a text statement that represents a chat comment that a particular user has entered asynchronously. A user account can submit new chat comments by entering text in a text entry widget 524 and terminating the entry with ENTER, RETURN, or a similar input signal, which triggers. The chat bubbles 512, 514, 516, 518, 520 can identify a user account that made the associated comment using account handles, pseudonyms, or names such as "D," "Charlie," "Pierre M," "Max," as in the example of FIG. 5. In one embodiment, the availability of resources can generate display instructions which, when rendered in GUI 604, cause displaying an arrow 522 near a user message. The arrow 522 is merely one example and other embodiments may use a different symbol, color, icon, or other visual graphic indication near a user message.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTPS or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTPS payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTPS or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    using a first computer, operating a plurality of different online chat conversations, each of the online chat conversations being associated with a set of sessions that are associated with different second computers, each of the online chat conversations being associated with two or more content items;
    receiving, from a third computer that is joining an online chat service, a content input comprising an unstructured text;
    creating and storing, in memory of the first computer, a plurality of paired data, each of the paired data associating the content input with one of the two or more content items;
    processing the paired data using a trained transformer-based machine learning model to generate prediction output comprising an identification of a particular content item among the content items having a probability value representing a greatest similarity of the particular content item to the content input;
determining whether the probability value is greater than a maximum similarity threshold value in comparison to at least one of the content items;
determining whether a difference of the probability value and a least similar content item is greater than at least a minimum threshold similarity value;
only when the probability value is greater than the maximum similarity threshold value and the difference of the probability value and the least similar content item is greater than at least the minimum threshold similarity value, assigning the third computer to a particular online chat conversation among the plurality of different online chat conversations, the particular online chat conversation being associated with the particular content item.

2. The computer-implemented method of claim 1, the one or more content items respectively identifying one or more first personal struggles and the content input comprising a set of sentences identifying a second personal struggle.

3. The computer-implemented method of claim 1, further comprising:
presenting, to a fourth computer, data identifying the third computer and the particular online chat conversation;
receiving, in response to the presenting, negative data from the fourth computer;
adding the negative data to a set of training data;
re-training the transformer-based machine learning model using the set of training data.

4. The computer-implemented method of claim 3, further comprising, prior to adding the negative data to the set of training data and re-training the transformer-based machine learning model using the set of training data, transmitting the negative data to one or more annotation computers; receiving, from the one or more annotation computers, one or more annotation data to label the negative data.

5. The computer-implemented method of claim 1, further comprising:
creating and storing training data comprising annotated data and feedback, each of the annotated data and the feedback having been formed by transmitting at least a portion of the prediction output to one or more annotation computers and receiving, from the one or more annotation computers, one or more annotation data to label the annotated data and feedback, the annotated data comprising at least a portion of adversarial data comprising one or more manually labeled adversarial prediction examples;
training the transformer-based machine learning model using the set of training data, including providing, in alternative batches, at least a portion of the annotated data and at least a portion of the feedback.

6. The computer-implemented method of claim 1, the transformer-based machine learning model comprising a supervised RoBERTa language model.

7. One or more non-transitory computer-readable storage media storing one or more sequences of instructions which, when executed using one or more processors, cause the one or more processors to execute:
using a first computer, operating a plurality of different online chat conversations, each of the online chat conversations being associated with a set of sessions that are associated with different second computers, each of the online chat conversations being associated with two or more content items;
receiving, from a third computer that is joining an online chat service, a content input comprising an unstructured text;
creating and storing, in memory of the first computer, a plurality of paired data, each of the paired data associating the content input with one of the two or more content items;
processing the paired data using a trained transformer-based machine learning model to generate prediction output comprising an identification of a particular content item among the content items having a probability value representing a greatest similarity of the particular content item to the content input;
determining whether the probability value is greater than a maximum similarity threshold value in comparison to at least one of the content items;
determining whether a difference of the probability value and a least similar content item is greater than at least a minimum threshold similarity value;
only when the probability value is greater than the maximum similarity threshold value and the difference of the probability value and the least similar content item is greater than at least the minimum threshold similarity value, assigning the third computer to a particular online chat conversation among the plurality of different online chat conversations, the particular online chat conversation being associated with the particular content item.

8. The one or more non-transitory computer-readable storage media of claim 7, the one or more content items respectively identifying one or more first personal struggles and the content input comprising a set of sentences identifying a second personal struggle.

9. The one or more non-transitory computer-readable storage media of claim 7, further comprising one or more sequences of instructions which, when executed using the one or more processors, cause the one or more processors to execute:
presenting, to a fourth computer, data identifying the third computer and the particular online chat conversation;
receiving, in response to the presenting, negative data from the fourth computer;
adding the negative data to a set of training data;
re-training the transformer-based machine learning model using the set of training data.

10. The one or more non-transitory computer-readable storage media of claim 9, further comprising one or more sequences of instructions which, when executed using the one or more processors, cause the one or more processors to execute, prior to adding the negative data to the set of training data and re-training the transformer-based machine learning model using the set of training data, transmitting the negative data to one or more annotation computers; receiving, from the one or more annotation computers, one or more annotation data to label the negative data.

11. The one or more non-transitory computer-readable storage media of claim 7, further comprising one or more sequences of instructions which, when executed using the one or more processors, cause the one or more processors to execute:
creating and storing training data comprising annotated data and feedback, each of the annotated data and the feedback having been formed by transmitting at least a portion of the prediction output to one or more annotation computers and receiving, from the one or more annotation computers, one or more annotation data to label the annotated data and feedback, the annotated data comprising at least a portion of adversarial data comprising one or more manually labeled adversarial prediction examples;

training the transformer-based machine learning model using the set of training data, including providing, in alternative batches, at least a portion of the annotated data and at least a portion of the feedback.

12. The one or more non-transitory computer-readable storage media of claim 7, the transformer-based machine learning model comprising a supervised RoBERTa language model.

* * * * *